United States Patent [19]

Dequin et al.

[11] Patent Number: 5,498,129
[45] Date of Patent: Mar. 12, 1996

[54] COUNTER-TORQUE DEVICE WITH DUCTED TAIL ROTOR AND DUCTED FLOW-STRAIGHTENING STATOR, FOR HELICOPTERS

[75] Inventors: Andre-Michel L. Dequin; Louis J. Daldosso, both of Aix en Provence; Henri F. Barquet, Chateauneuf les Martigues, all of France

[73] Assignee: Eurocopter France, Marignane Cedex, France

[21] Appl. No.: 298,953

[22] Filed: Sep. 1, 1994

[30] Foreign Application Priority Data

May 4, 1994 [FR] France .................................. 94 05481

[51] Int. Cl.[6] .............................................. B64C 27/82
[52] U.S. Cl. ............................... 415/209.3; 415/211.2; 244/17.19
[58] Field of Search ............................... 415/200, 209.3, 415/209.2, 211.2; 244/17.19, 17.27

[56] References Cited

U.S. PATENT DOCUMENTS

| | | | |
|---|---|---|---|
| 3,594,097 | 7/1971 | Mouille et al. | 416/134 A |
| 4,585,391 | 4/1986 | Vuillet | 415/210 |
| 4,594,761 | 6/1986 | Murphy . | |
| 4,626,172 | 12/1986 | Mouille et al. | 416/134 A |
| 4,626,173 | 12/1986 | Mouille et al. | 416/134 A |
| 5,131,604 | 7/1992 | Yoerkie, Jr. et al. | 244/17.19 |
| 5,251,847 | 10/1993 | Guimbal | 244/17.19 |
| 5,272,869 | 12/1993 | Dawson . | |

FOREIGN PATENT DOCUMENTS

| | | | |
|---|---|---|---|
| 1531536 | 5/1968 | France . | |
| 2534222 | 10/1982 | France | 244/17.19 |

Primary Examiner—Thomas E. Denion
Assistant Examiner—Michael S. Lee
Attorney, Agent, or Firm—Larson and Taylor

[57] ABSTRACT

The rotor is supported within the duct by a stationary flow-straightener with vanes connecting the wall of the duct to a central body housing the mechanism for driving the rotor. This mechanism is surrounded by a casing equipped with radial arms bearing removable means for fastening to an internal flange of the body, so as to fasten the flow-straightener and the casing rigidly to one another, and both into the duct.

24 Claims, 10 Drawing Sheets

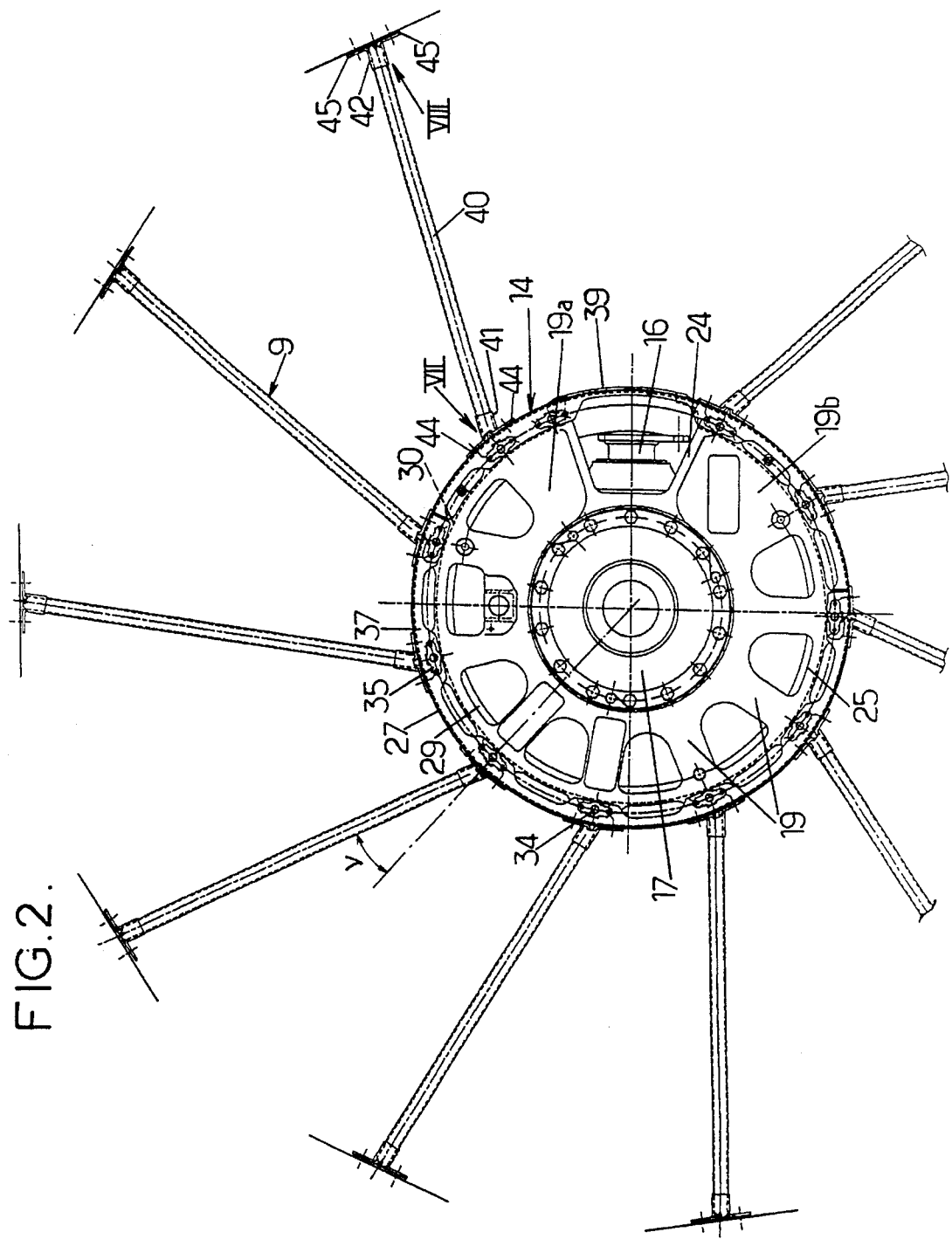

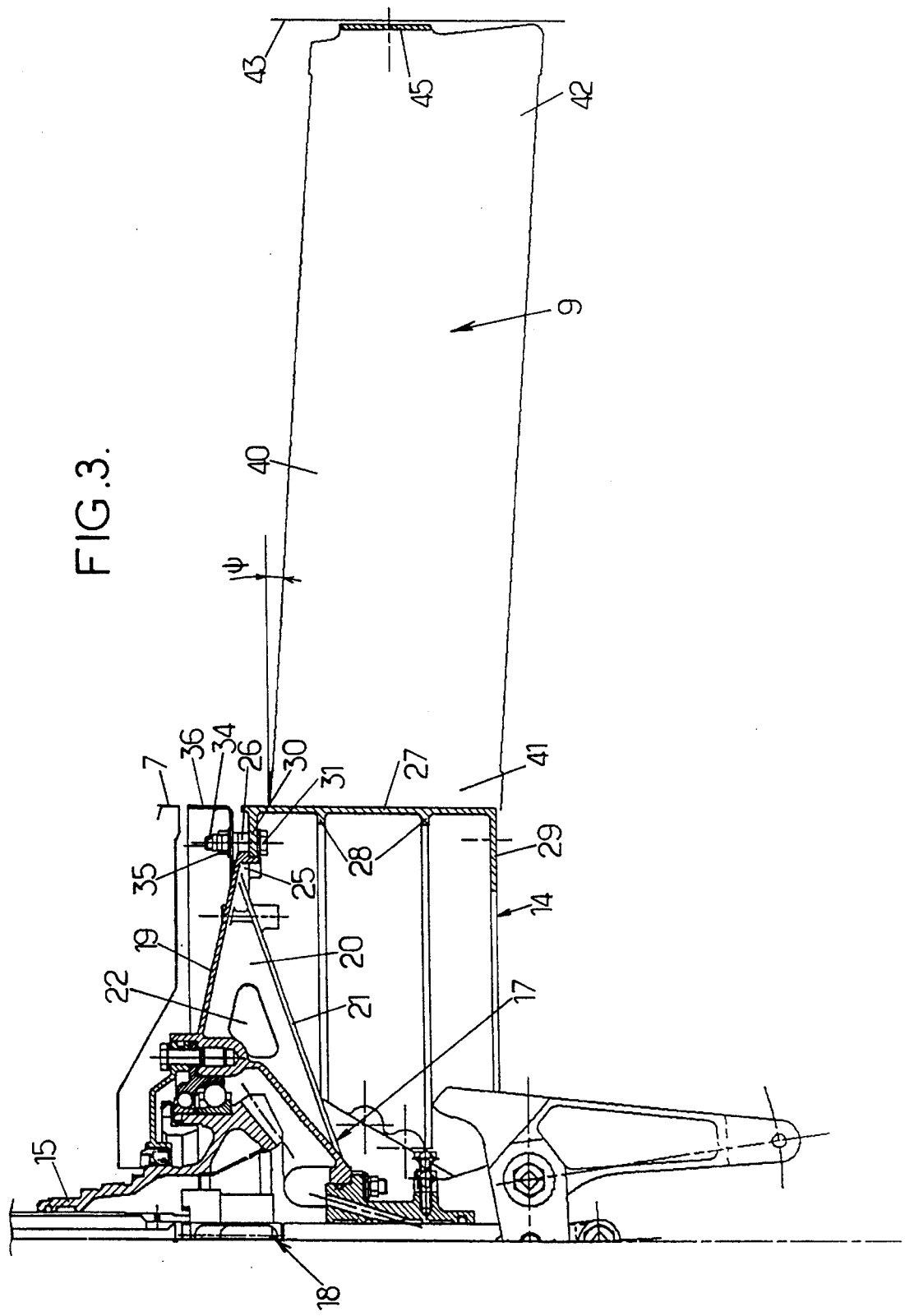

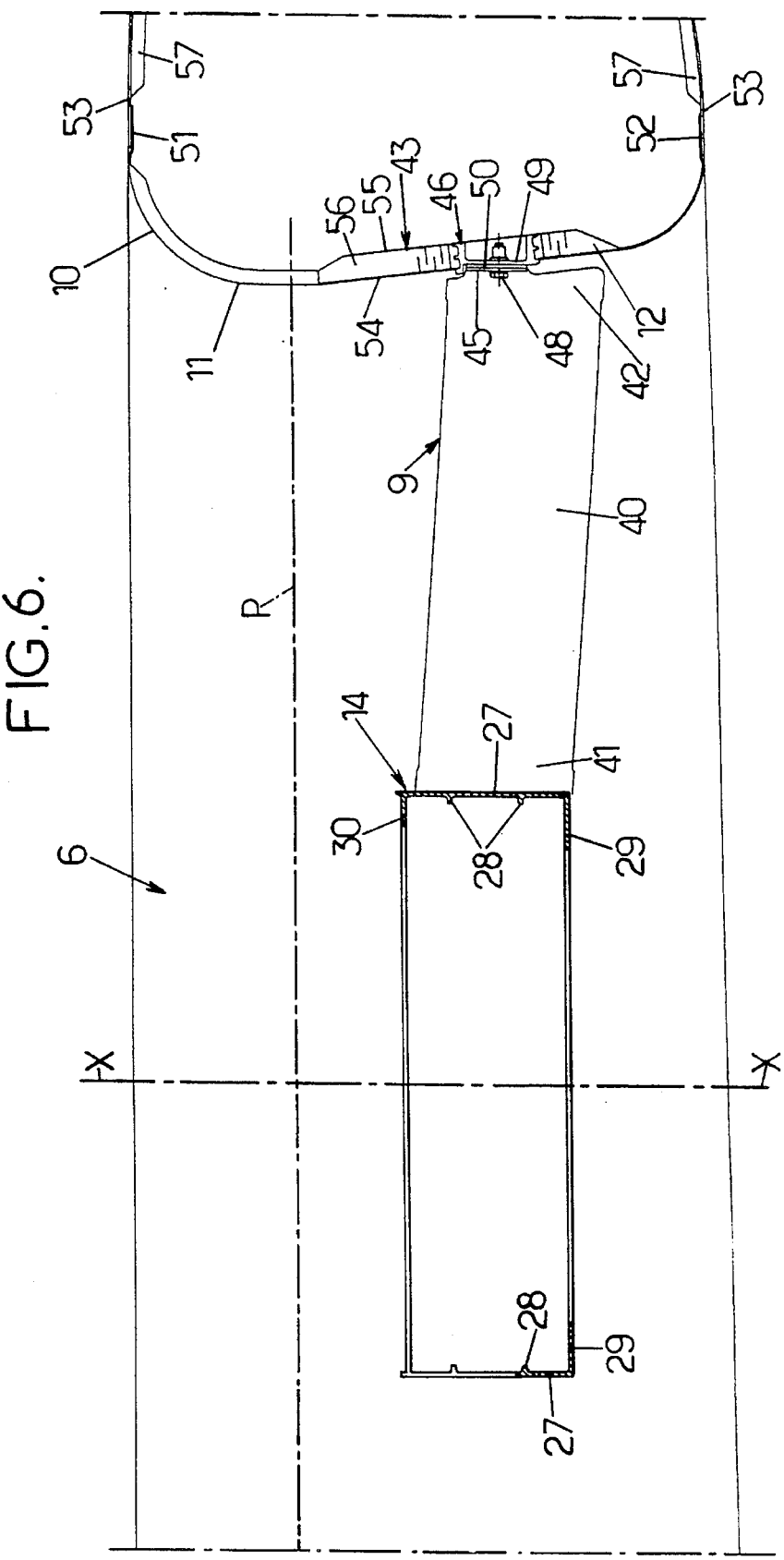

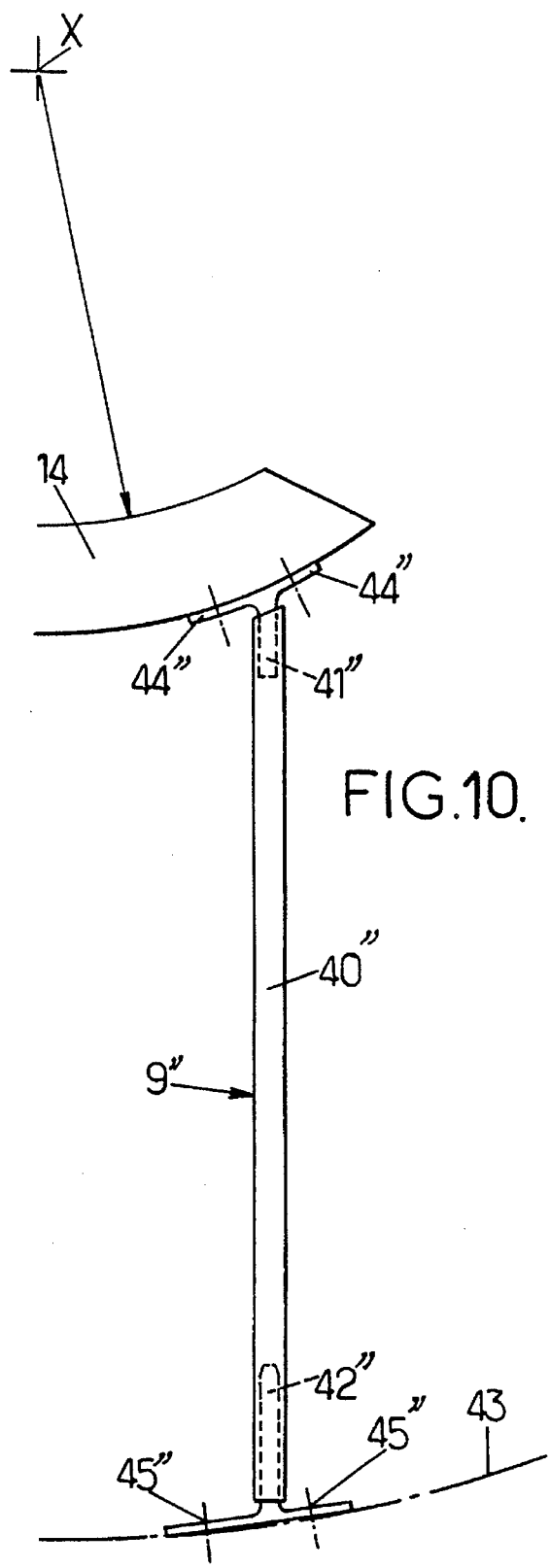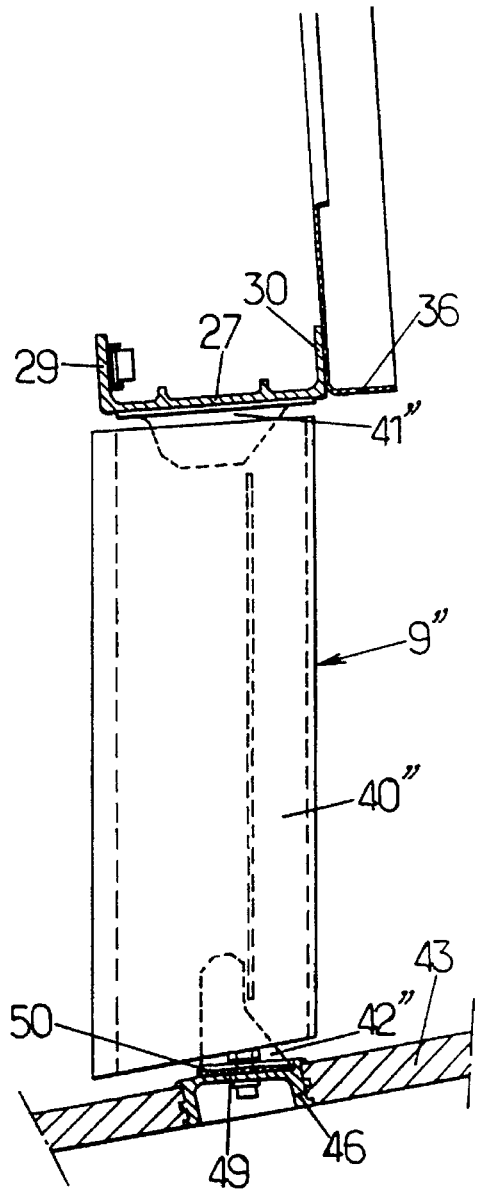
FIG.10.
FIG.11.

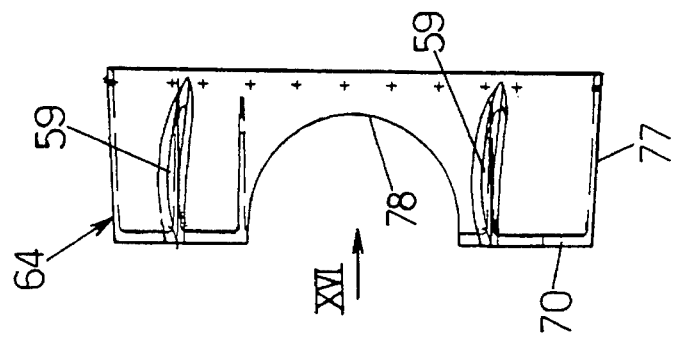
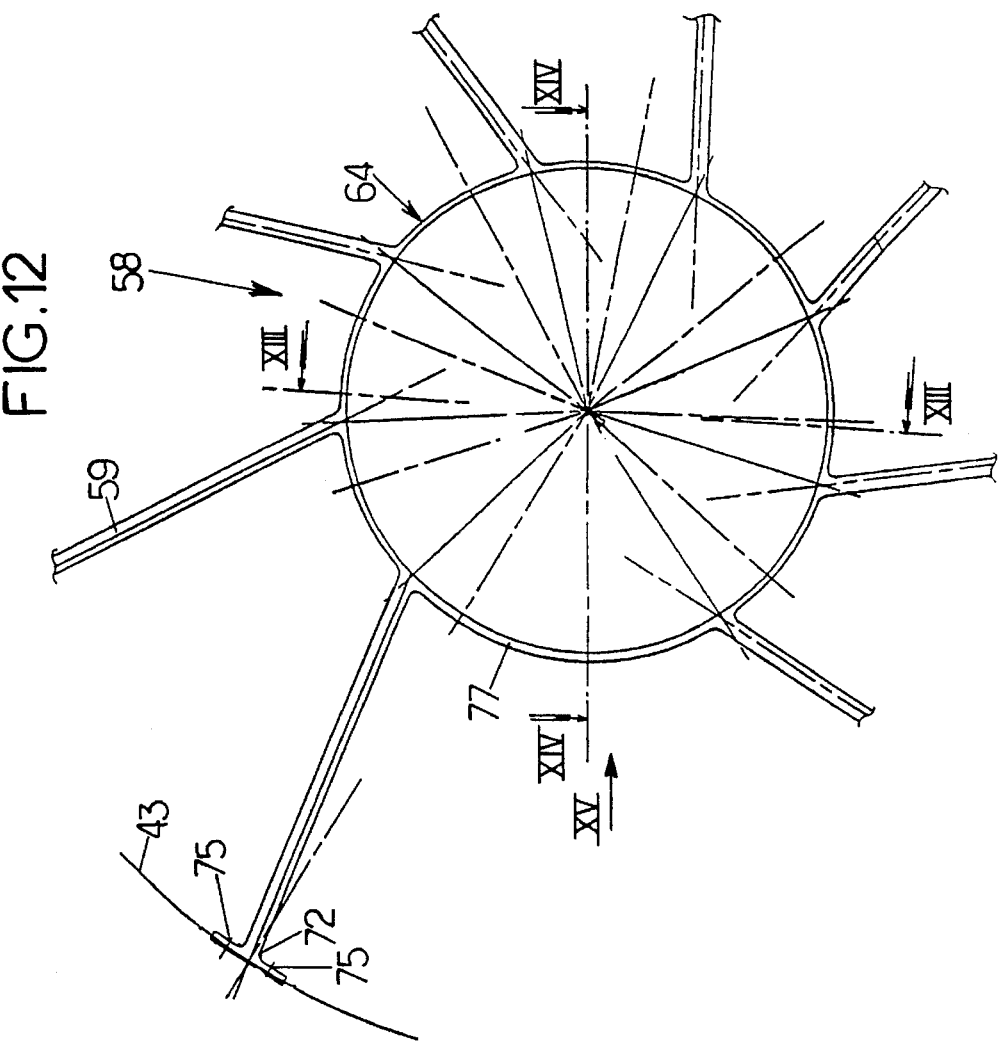
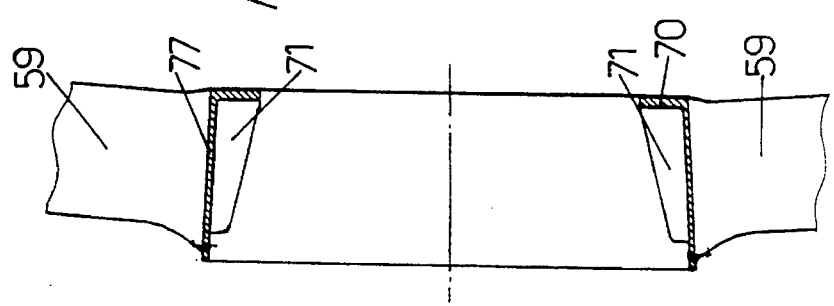

COUNTER-TORQUE DEVICE WITH DUCTED TAIL ROTOR AND DUCTED FLOW-STRAIGHTENING STATOR, FOR HELICOPTERS

FIELD OF THE INVENTION

The invention relates to a ducted counter-torque device for a rotary-wing aircraft, such as a helicopter, of the type known by French Patent FR 2 534 222, and comprising:

a substantially axisymmetric duct of axis substantially transverse to the longitudinal axis of the aircraft, and passing through a fairing in the rear part of the aircraft, a multi-blade rotor mounted substantially coaxially in the duct and driven by a rotational-drive mechanism fixed substantially coaxially in the duct, so that the rotation of the rotor generates an airflow in the duct, and a flow-straightening stator, fixed in the duct downstream of the rotor, with respect to the direction of the airflow, and including an annular central body surrounding the rotational-drive mechanism, as well as stationary vanes each exhibiting, between a vane root and a vane tip, a main vane section with aerodynamic profile straightening out the airflow downstream of the rotor towards the axis of the duct, and extending between the annular central body and an annular wall of the duct, to which body and wall they are each linked respectively by their vane root and by their vane tip, so as to support the rotational-drive mechanism and the rotor within the duct.

BACKGROUND OF THE INVENTION

The aforementioned patent also describes the fact that the duct is formed, in succession from the upstream end towards the downstream end, of a convergent inlet nozzle, a cylindrical part, and a divergent nozzle, the blades of the rotor rotating in the cylindrical part, and the support for the rotor and the rotational-drive mechanism within the duct being provided either by the vanes alone, or by substantially radial support arms, or finally, by arms and the vanes, still substantially radial ones. The aforementioned patent also describes a flow-straightener produced in the form of a monolithic assembly with a plurality of stationary vanes and mounted as a single piece within the divergent nozzle of the duct, in which nozzle it is fitted on the outlet side. Such a flow-straightener includes not only an annular body or an internal ring, but also a concentric external ring, housed in a recess in the divergent nozzle, and equipped with a flange for fastening against a lateral face of the fairing, the vanes being fastened radially between the internal and external rings, it being possible for the rings to exhibit cutouts for passage of the support arms, the vanes then being located between the cutouts.

SUMMARY OF THE INVENTION

The object of the invention is to improve the counter-torque device of the aforementioned type, so as to improve the mechanical link between the fairing, the flow-straightener, and the rotational-drive mechanism supporting the rotor, in order to introduce greater rigidity into the device, to guarantee correct positioning of the rotor within the duct, and simultaneously to improve the aerodynamic efficiency and acoustic performance of the counter-torque device.

In effect, it has been observed that the device according to the abovementioned patent did not offer full guarantees against local deformation of the flow-straightener to prevent any interference between the flow-straightener and moving parts, and that the structure of the flow-straightener was not entirely favorable to a good link of the rotational-drive mechanism with the transmission arm linking it to the source of motive power.

Another object of the invention is to improve the counter-torque device of the abovementioned known type, in order to facilitate the operations of maintenance, and particularly interchangeability of the flow-straightener, as well as interventions on the assembly made up of the rotational-drive mechanism and of the rotor, and in particular on the removal and refitting of this assembly.

For this purpose, the counter-torque device of the aforementioned type is characterized in that its rotational-drive mechanism is encased in a casing equipped with substantially radial rigidifying arms connected to one another by a rim extending in a circumferential direction around at least a part of the casing, the rigidifying arms bearing, at their external radial end, removable fastening means interacting with complementary fastening means formed on an internal radial flange for fastening and centring of the annular central body of the flow-straightener, so as rigidly to fasten the flow-straightener and the casing to one another, and both into the duct.

This very rigid fastening makes it possible to decrease the clearance between the lateral wall of the duct and the tip of the blades of the rotor, the position of which is firmly maintained in the duct by the interaction of the flow-straightener with the casing of the rotational-drive means. The decrease in this clearance makes possible not only an increased counter-torque thrust but a better natural frequency of the assembly enabling the level of vibration to be reduced. In addition, the greater rigidity of the device is favourable to better coupling of the transmission arm to the rotational-drive mechanism.

The desired rigidity is particularly provided if the flow-straightener includes at least as many vanes as the casing includes rigidifying arms, and each arm is fastened to the flow-straightener body substantially radially inside at least one vane root connecting the corresponding vane to the said flow-straightener body.

In a preferred embodiment, the rigidifying arms are flattened in a circumferential direction, inclined from the casing towards the flow-straightener body and from the upstream end to the downstream end of the duct, and each reinforced by at least one of substantially radial ribs of substantially triangular shape extending downstream in the duct on the side of the casing, and thinning towards the flow-straightener body, and substantially equal in number to the vanes of the flow-straightener.

In order to produce a flow-straightener which may be interchangeable, the vanes, which are hollow in order to lighten the flow-straightener, may be individually attached, for example in a permanant manner by screwing or riveting, to the flow-straightener body and, removably, for example by screwing, to the lateral wall of the duct with the aid of tabs respectively for fastening their vane root and their vane tip.

The vanes may be made of metal, for example made of an aluminium alloy, or may be composite.

In this latter case, each composite vane may effectively be hollow or include a foam core, particularly when it is produced by shaping fibrous reinforcing fabrics preimpregnated with a synthetic rigidifying resin around the foam core. However, the vane may equally well be molded by transferring an epoxy resin onto fibrous reinforcing fabrics, or be injected with a reinforcement of short reinforcing fibres embedded in a matrix of synthetic rigidifying resin.

As an alternative to metal or composite vanes individually attached to the annular flow-straightener body which is made of metal alloy, it is possible for the flow-straightener body and vanes to be of a single piece made of composite material. In this case, the composite flow-straightener is preferably a monobloc compression-molded component comprising a reinforcement of short reinforcing fibres, preferably glass or carbon fibres, embedded in a synthetic rigidifying matrix, preferably and respectively a vinyl ester resin or a PEEK resin.

In order to decrease the noise, by decreasing the interactions of the wake of the blades with the vanes of the flow-straightener, and in order simultaneously to enable better take-up of the torque of reaction to the rotation of the rotor and/or better position of the rotor in the duct, the vanes are inclined from the flow-straightener body towards the wall of the duct, with respect to the radial direction, in the opposite direction to the direction of rotation of the rotor, and/or at a slant from the upstream towards the downstream end of the duct.

In order to facilitate the links of the vanes of the flow-straightener with the lateral wall of the duct, it is advantageous for each vane to be connected to the latter by its vane tip being fastened to an insert sealed into the wall of the duct. The insert may be made of metal (for example cast from aluminium alloy, then machined) or composite, made of injection-moulded plastic and reinforced with short reinforcing fibres.

For good adherence of the inserts and an advantageously simple, rigid and lightweight production of the lateral wall of the duct, the latter is preferably of a single piece made of composite sandwich forming, between two peripheral annular rims for coupling to two composite lateral skins for the fairing, and in succession from upstream to downstream, a convergent inlet nozzle, a cylindrical part, and a divergent nozzle to which the vanes are fastened, and which comprises an internal skin and an external skin between which there extends a layer of honeycomb structure, for example made of nomex, the thickness of which is greater in the divergent nozzle than it is in the convergent nozzle and the cylindrical part, each of the internal and external skins, of the rims and of the lateral skins being of laminated structure of at least two superimposed webs of fibrous fabric made rigid by a synthetic impregnation resin, the internal skin being of a greater thickness than that of the external skin, itself having a greater thickness than that of the lateral skins.

BRIEF DESCRIPTION OF THE DRAWINGS

Other characteristics and advantages of the invention will emerge from the description given hereinbelow, in a non-limiting way, of embodiments described with reference to the appended drawings in which:

FIG. 2 is a diagrammatic partial view of the flow-straightener of FIG. 1 in side elevation from the inlet of the duct, FIG. 3 is a diametral half-section through the assembly housed within the duct of the device of FIG. 1, FIG. 10 represents diagrammatically, on a larger scale, another alternative for mounting a flow-straightener vane, FIG. 11 represents partly in section and partly in side elevation, the mounting of a vane of FIG. 10, FIG. 12 represents diagrammatically and partially a composite monobloc flow-straightener viewed from one side of the duct, FIGS. 13 and 14 are sections on XIII—XIII and XIV—XIV of FIG. 12, FIG. 15 is a view in the direction of the arrow XV of FIG. 12.

DETAILED DESCRIPTION OF THE PREFERRED EMBODIMENTS

Figure 1:
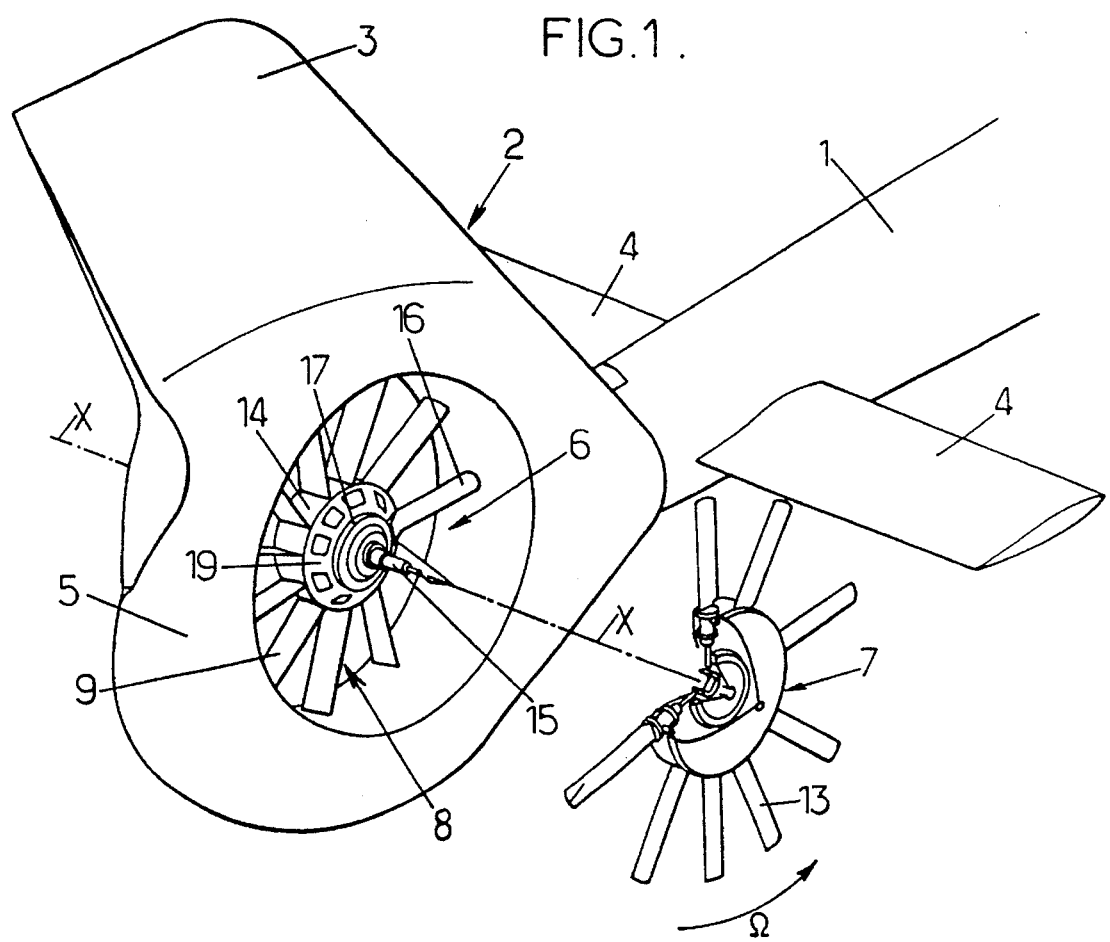
FIG. 1 is a ¾ perspective rear view of a ducted counter-torque device with rotor and flow-straightening stator arranged in a duct passing through the rear part of a helicopter, the rotor being represented out of the duct with partial cutaway for greatest clarity.

In FIG. 1, the tail boom 1 of a helicopter, of which the fuselage and single main rotor have not been represented, supports at its rear end an empennage 2, the upper part of which is formed into a vertical stabilizer 3, and a horizontal stabilizer with two control surfaces 4 on either side of the boom 1. The base of the empennage 2 is set out as a fairing 5 through which there passes transversely a duct 6 for the flow of air of a ducted counter-torque device also comprising a variable-pitch multi-blade rotor 7 mounted so that it can rotate and substantially coaxial in the duct 6, as well as a flow-straightening stator 8, fixed downstream of the rotor 7 in the duct 6 with respect to the direction of flow of the airflow passing through the latter and including stationary vanes 9.

The duct 6 exhibits, about its axis X—X substantially transversal to the longitudinal axis of the helicopter, a practically axisymmetric shape visible in FIG. 6. and comprising, in succession from the upstream end to the downstream end of the duct 6, a convergent inlet nozzle 10, with a rounded edge, then a cylindrical part 11, and a divergent nozzle 12, ending in a duct outlet with rounded edge. The rotor 7 is mounted in the duct 6 on the inlet side of the latter, and so that its blades 13 rotate in the cylindrical part 11 of the duct 6, the axes for changing the pitch of the blades 13 defining the plane P of rotation of the rotor in which they move and which is substantially perpendicular to the axis X—X of the shrouded duct 6. In a known manner, the rotor 7 is mounted and rotationally driven by a rear transmission box, with which is associated a device for collectively controlling the pitch of the blades 13.

As far as the structure, the configuration and operation of the rear transmission box and of the device for collectively controlling the pitch of the blades 13 as well as of the rotor 7 are concerned reference will advantageously be made to the French Patent FR 1 531 536 and American Patents U.S. Pat. No. 3,594,097 and U.S. Pat. No. 4,626,173, which are incorporated into the present descriptive text by way of reference, because these members do not form part of the invention.

However, the rear transmission box is encased overall by a casing, itself surrounded by an annular central body 14 of the flow-straightener 8. This annular body 14, of cylindrical or frustoconical external shape, is kept coaxial with the duct 6 by being secured to the structure of the empennage 2 by means of the vanes 9 of the flow-straightener 8, which keep the annular body 14 at the center of the duct 6 and on the outlet side thereof with respect to the rotor 7. The latter is rotationally driven by a drive shaft 15,1 itself driven, by means of the rear transmission box, from a transmission shaft passing through an arm 16 and connected to an auxiliary output of the main transmission box of the helicopter. A part of the arm 16 is arranged substantially radially in the duct 6, substantially in the place of one of the vanes 9 of the flow-straightener 8, in the space delimited between the two vanes 9 which are separated from one another most in FIGS. 1 and 2. It is known that the rotation of the rotor 7 in the duct 6 creates a guided flow of air through the latter, generating a transverse counter-torque thrust, the variation in amplitude of which is controlled by the device for collectively controlling the pitch of the blades 13, actuated by a control rod, not represented, because it is assumed that the arm 16 of FIG. 1 serves as a fairing to the transmission shaft and to this rod.

Figure 4:
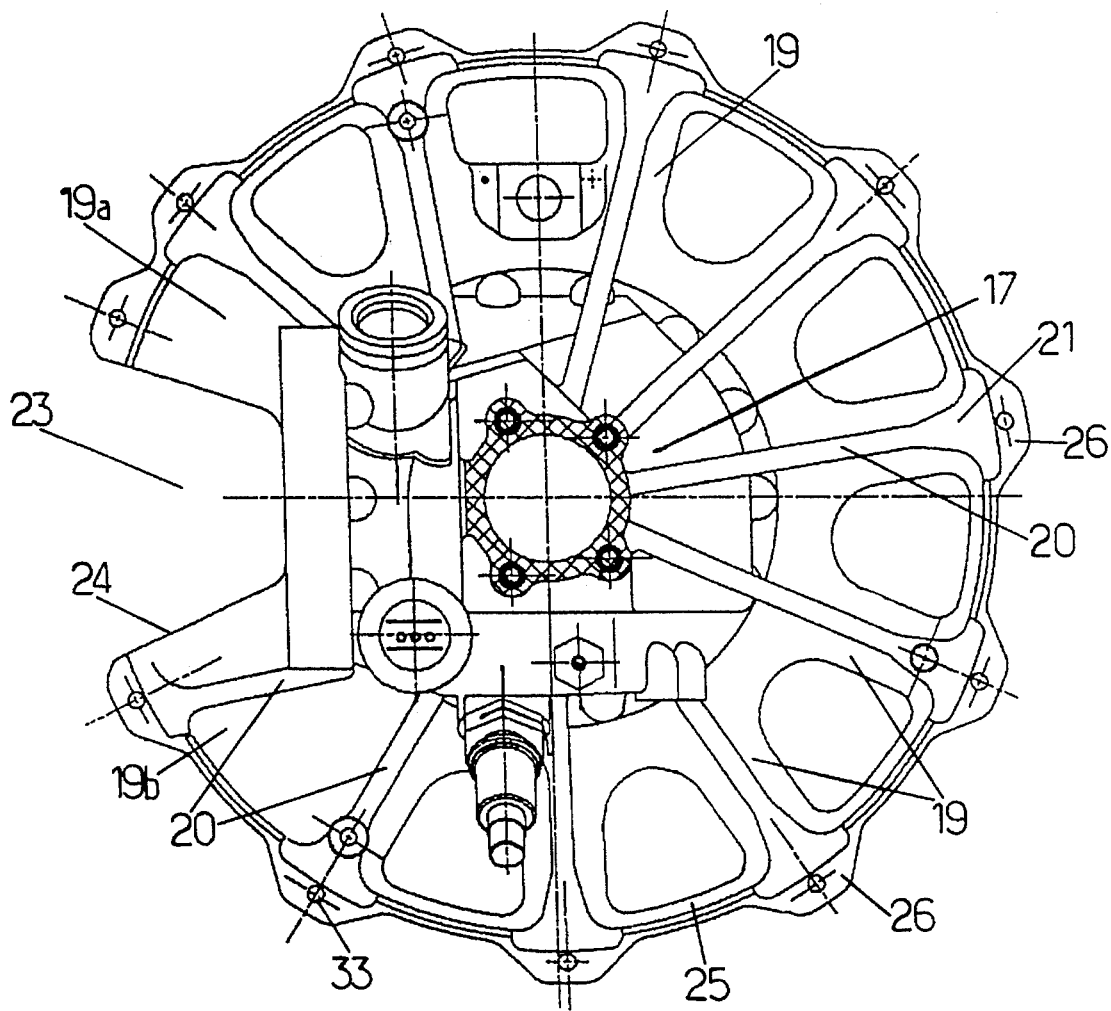
FIG. 4 is a side elevation of the casing of the rear transmission box of the rotor of FIG. 1 and representing that one of its faces which points towards the outlet of the duct.
Figure 5:
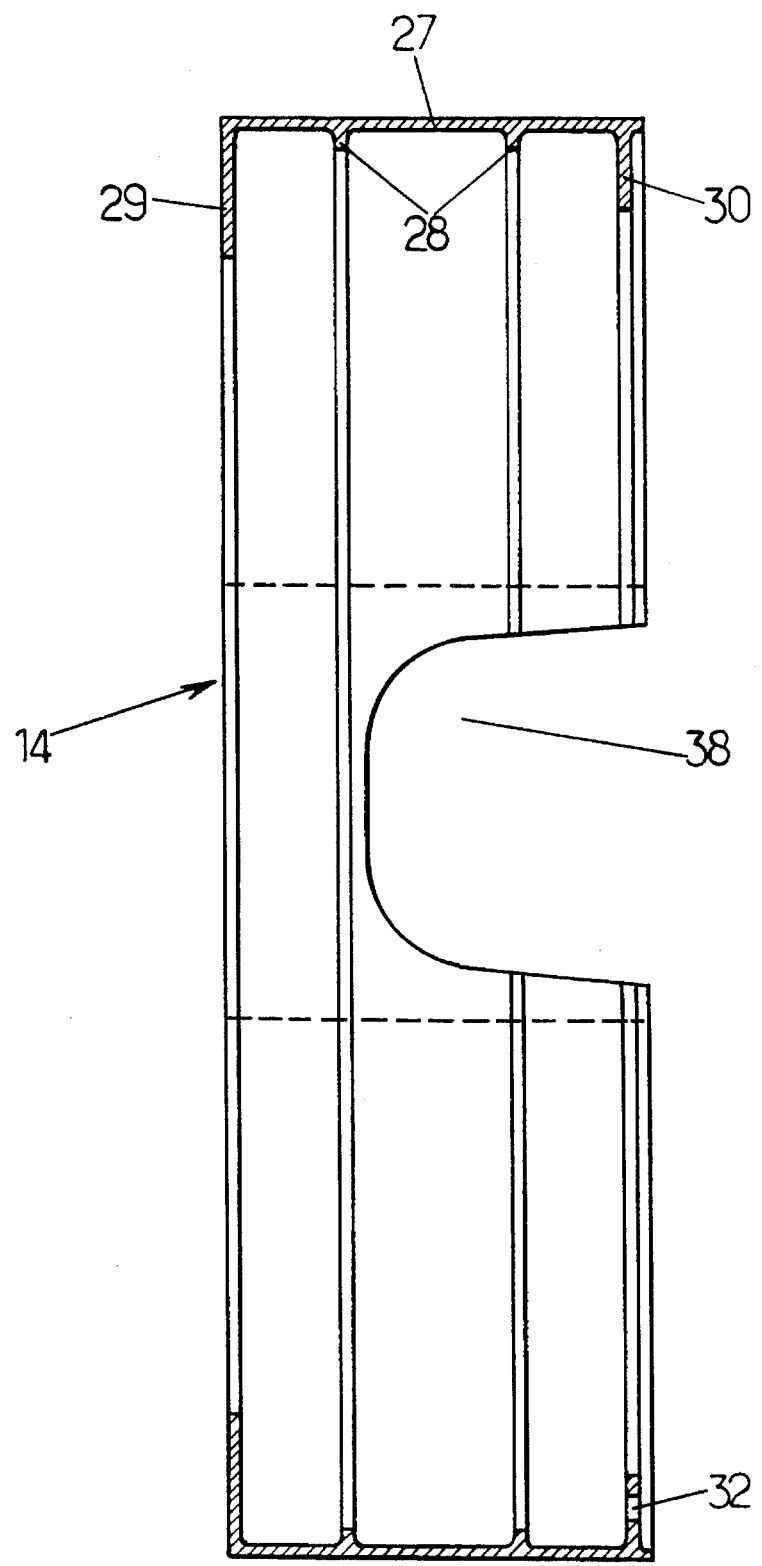
FIG. 5 is a diametral section of the flow-straightener annular central body, FIG. 6 diagrammatically represents the flow-straightener body in a section perpendicular to that of FIG. 5 as well as an axial half-section of the duct and of its lateral wall and a vane Joining the latter to the flow-straightener body.

The vanes 9, fastened into the divergent nozzle 12 of the duct 6, downstream of the blade 13 of the rotor 7, ensure recovery of the rotational energy of the airflow downstream of the blades 13, by straightening out this flow towards the axis X—X of the duct 6, and providing an additional counter-torque thrust as explained in French Patent FR 2 534 222, the description of which is incorporated into the present descriptive text by way of reference, particularly as regards the description of FIGS. 4 and 5 of this patent. The straightening-out of the airflow by the vanes 9 is particularly ensured by the appropriate choice of the asymmetric aerodynamic profile of their profiled main vane section, and in particular its camber and angular setting with respect to the axis X—X of the duct 6.

In FIGS. 2, 3 and 4 can be seen the casing 17 which encases an assembly identified overall as 18 (FIG. 3) and corresponding to the rear transmission box and to the components of the pitch control device which pass through it. This casing 17 is cast as a single piece from metal alloy. It comprises rigidifying arms 19 extending substantially radially outwards, equal or one less in number than the number of vanes 9 of the flow-straightener 8 depicted completely in FIG. 1, for the reason indicated hereinbelow. Each arm 19 is flattened in the circumferential direction (see FIGS. 2 and 4) and inclined from the casing 17 towards the body 14 and from the inlet towards the outlet of the duct 6, as visible in FIGS. 1 and 3. In addition, it is reinforced downstream by a radial rib 20 (see FIGS. 3 and 4) of triangular shape, which extends along the axis of the duct 6 along its side connected to the casing 17, and which thins up to its external radial end, towards the body 14, each rib 20 having a flat and widened downstream edge 21 and being perforated at 22 in its central part. Two neighboring arms 19a and 19b are both wider and further separated from one another than the other arms 19, in order between them to delimit a cutout 23 with an edge 24 having excess thickness upstream, for the passage of the transmission arm 16, and the arm 19b is widened to the point of constituting a double arm reinforced by two downstream ribs 20 (see FIG. 4). The arms 19, 19a, and 19b are joined together by a rim 25, which is substantially circular and circumferential, also radially flattened and ribbed towards the downstream end, which surrounds the casing 17 except between the arms 19a and 19b at the cutout 23. Each arm 19, 19a and 19b is equipped, radially on the outside of the rim 25 and of the external radial end of each corresponding rib 20, with a tab 26 for screw-fastening, which exhibits machined radial bearing faces.

The tubular central body 14 of the flow-straightener 8 is shown in FIGS. 2, 3, 5 and 6. It is produced by machining a block of aluminium alloy from a forged blank. It exhibits a lateral wall 27 with a cylindrical and axially axisymmetric external surface, and which is made rigid by two internal and annular radial ribs 28, axially spaced apart in its central part, as well as by two internal and annular radial turned-down edges 29 and 30, at its axial ends, the downstream edge 29 of which is wider than the upstream edge 30, constituting a flange for centred fastening to the tabs 26 of the arms 19 of the casing 17. This fastening is provided by a set of screws 31 (FIG. 3) passing through holes 32 (FIG. 5) distributed over the periphery of the radial flange 30 of the body 14, and the holes 33 (FIG. 4) opposite on the tabs 26 at the external radial end of the ribs 20 of the arms 19 of the casing 17, these tabs 26 being applied against the upstream face of the flange 30, and the screws 31 are screwed into self-locking nuts 34 (FIGS. 2 and 3) mounted so that they float and are removable in nut-holding tabs 35 which are riveted to the upstream face of the serrated radial web 37 of an annular angle bracket 36 (FIG. 3), thus simultaneously fastened against the tabs 26 and the flange 30, and substantially forming a seal between the rotor 7 and the body 14 as regards the airflow leaving the rotor 7. The large bearing area of the nut-bearing tabs 35 gives a clamping load which is low and stable over time, and the centring of the rear transmission box 18 together with its casing 17 is guaranteed by the accurate internal diameter of the flange 30 of the flow-straightener body 14.

For the passage of the transmission arm 16, the body 14 exhibits, facing the cutout 23 in the casing 17, a lateral opening 38 (FIG. 5) formed in the lateral wall 27 and in the flange 30 of the body 14, and with an edge 39 which has excess thickness towards the outside (FIG. 2).

Each vane 9, the main vane section with aerodynamic profile 40 of which extends over the most part of its span, is individually attached to the flow-straightener 8 and connected on the one hand to the lateral wall 27 of the body 14, practically from the upstream flange 30 to the downstream rib 29 of the latter, by a vane root 41 and, on the other hand, via a vane tip 42 to the annular wall 43 of the duct 6.

The connection of the vane root 41 to the body 14 is provided by a permanent fastening by riveting of tabs 44 for fastening the root 41, these tabs 44 being transverse, curved, and inclined, in the case of one of them, on the vane 9 suction face side and, in the case of the other, on the vane 9 pressure face side, on the lateral face 27 and radially on the outside of a tab 26 for fixing a rib 20 and an arm 19 of the casing 17, which tab is fixed to the flange 30 of the body 14 by a removable screw connection. The vanes 9 are thus fixed by their root 41 against the lateral wall 27 of the body 14 directly in line with the ribs 20 of the arms 19 of the casing 17, which gives good rigidity. There are as many vanes 9 as ribs 20.

Figure 8:
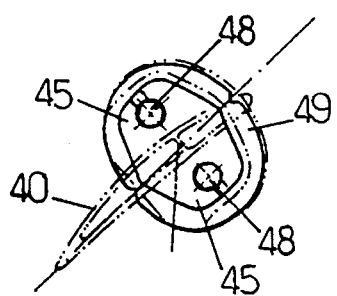

In contrast, the vane tip 42, also equipped with transverse fastening tabs 45, which are curved and inclined in the case of one of them on the vane 9 suction face side and, in the case of the other, on the vane 9 pressure face side, is fixed to the annular wall 43 by a removable screw-fastening of its tabs 45 into an insert 46 sealed into the lateral wall 43 (see FIGS. 6 and 8).

The tabs 44 and 45 of the vane 9 roots 41 and tips 42 are curved to correspond to the curvature of the surface against which they are fastened, and also inclined transversely and from upstream to downstream with respect to the profiled part 40 of the vanes 9 so that each vane 9 is, on the one hand, inclined with respect to the radial direction, from the flow-straightener body 14 towards the wall 43 of the duct 6, and in the opposite direction from the direction of rotation of the rotor 7, by an angle ν which may reach 24° at the vane root 41, so as to transmit the torque taken up by the rear transmission box as reaction to the rotation of the rotor 7, in compression in the vanes 9 rather than in bending, and simultaneously to reduce the noise of interaction of the wake of the blades 13 with the vanes 9. On the other hand, each vane 9 is simultaneously inclined at a slant from the flow-straightener body 14 towards the annular wall 43 and from the upstream end to the downstream end in the duct 6 by an angle ψ, of the order of 4°, which makes it possible to decrease the noise of interaction of the wake of the blades 13 with the vanes 9 by separating the leading edge of the vanes 9 from the trailing edge of the blades 13 at the periphery of the duct 6 and, simultaneously, to guarantee correct positioning of the rotor 7 within the duct 6 by fastening the flow-straightener body 14 and the rear transmission box which it encases at a slight distance behind or downstream of the plane of rotation P of the rotor 7.

By way of example, each vane 9 may exhibit an aerodynamic profile of NACA 65 A 10 type, with a chord of 80 mm and a negative angle of attack setting of 2.5° about its axis, to straighten out the airflow leaving the rotor 7, correctly.

The functions thus fulfilled by the flow-straightener 8 are essentially that it holds the rear transmission box 18 and the rotor 7 so as to withstand the loads resulting from the torque of the rear transmission box 18 and of the transmission arm 16, from the torque and from the loading for control in terms of yaw, by varying the pitch, from the thrust of the rotor 7, from the weight of the rotor 7, flow-straightener 8 and rear transmission box 18 with its casing 17 assembly, and from the thermal loadings between the materials. The stresses induced by the screwed take-up of the rear transmission box 18 and its casing 17 on the annular body 14 of the flow-straightener 8 are low, owing to the fact that the number of radial arms 19 and ribs 20 is substantially as great as that of the vanes 9, which gives a sizeable safety margin.

In order to reduce the mass of the flow-straightener 8, the vanes 9 are hollow, and may be made of metal (aluminium alloy for example) or composite materials. In the latter case, each composite vane 9 may include a foam core, around which the blade is produced, for example by shaping webs or plys of fibrous reinforcing fabrics, for example made of carbon and/or glass, preimpregnated with a synthetic rigidifying resin, for example an epoxy resin.

However, it is equally possible for each composite vane 9 to be moulded by transferring an epoxy resin onto webs or plys of fibrous reinforcing fabrics placed as a preform. Each composite vane 9 may equally well be an injected vane having a reinforcement made up of short reinforcing fibres, for example made of glass or carbon, embedded in a matrix of a synthetic resin, for example respectively vinyl ester or polyether-ether-ketone, termed PEEK resin.

Figure 7:
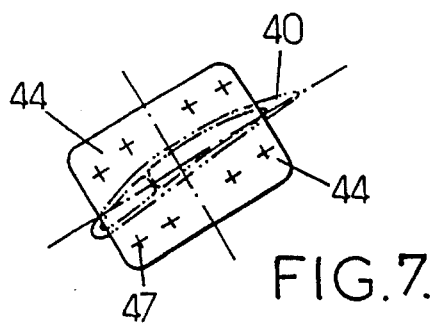
FIGS. 7 and 8 represent, in the directions of the arrows VII and VIII of FIG. 2, the respective fastenings of the vane root to the flow-straightener body and of the vane tip to an insert in the lateral wall of the duct.

The tabs 44 and 45 for fastening the root 41 and the tip 42 of the vanes 9 may be of a single piece with the profiled part 40 of these vanes. FIG. 7 represents the view in the direction of the arrow VII of FIG. 2 of a vane root 41 with its two transverse tabs 44 each fixed by four rivets 47 onto the body 14 and on either side of the profile of the main vane section 40.

FIGS. 6 and 8 represent the removable fastening of the vane tip 42 onto an insert 46 and in the direction of the arrow VIII of FIG. 2. The insert 46 is a substantially cylindrical body, exhibiting peripheral ribs projecting outwards, in order to ensure anchorage into the wall 43, and this body has an end face forming a flat fastening face 49 fitting substantially flush into the lateral internal face of the annular wall 43. The two tabs 45 of the vane root 42 are each fixed by one of two screws 48 to the fastening face 49, with interposition between each tab 45 and the face 49 of a removable spacer piece 50, for example one which can be shimmed, for adjusting the clearance with which the flow-straightener 8 is fitted into the divergent nozzle 12 of the duct 6.

The insert 46 may be a moulded body made of aluminium alloy and with a machined, flat fastening face 49, or an injection-moulded plastic component reinforced with short inorganic or organic reinforcing fibres, for example glass or carbon.

Figure 9:
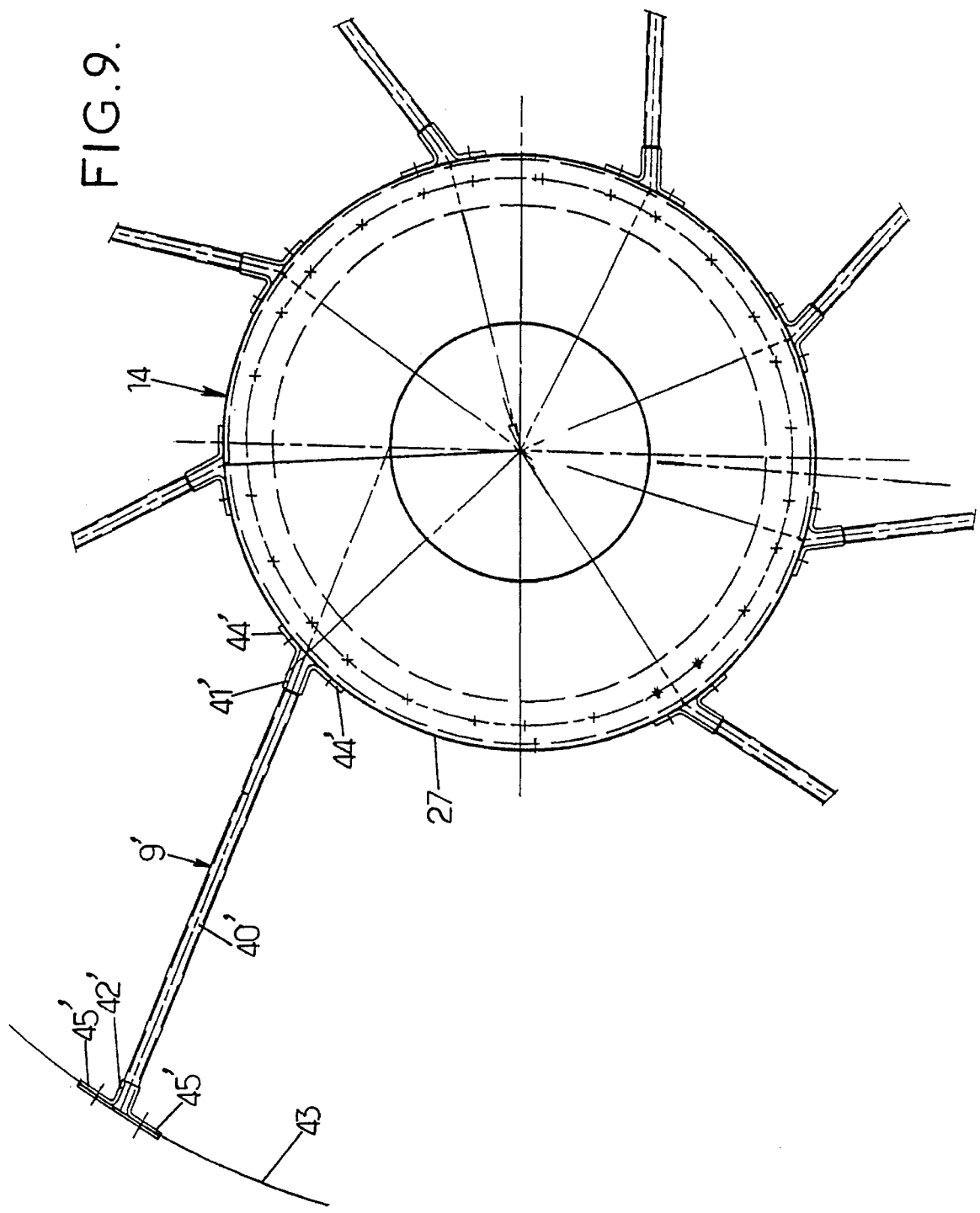
FIG. 9 represents diagrammatically, in partially sectioned side elevation, an alternative for mounting the vanes of the flow-straightener.
Figure 14:
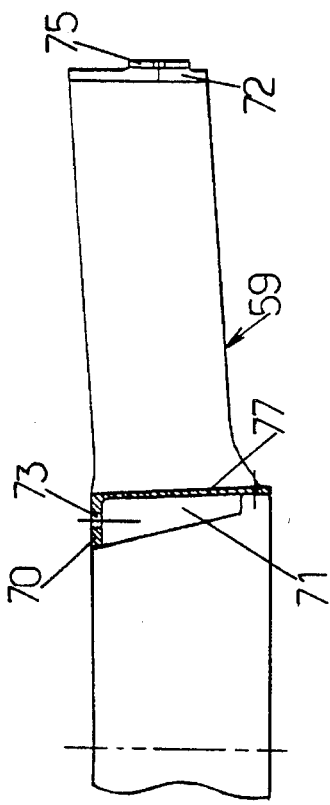
Figure 16:
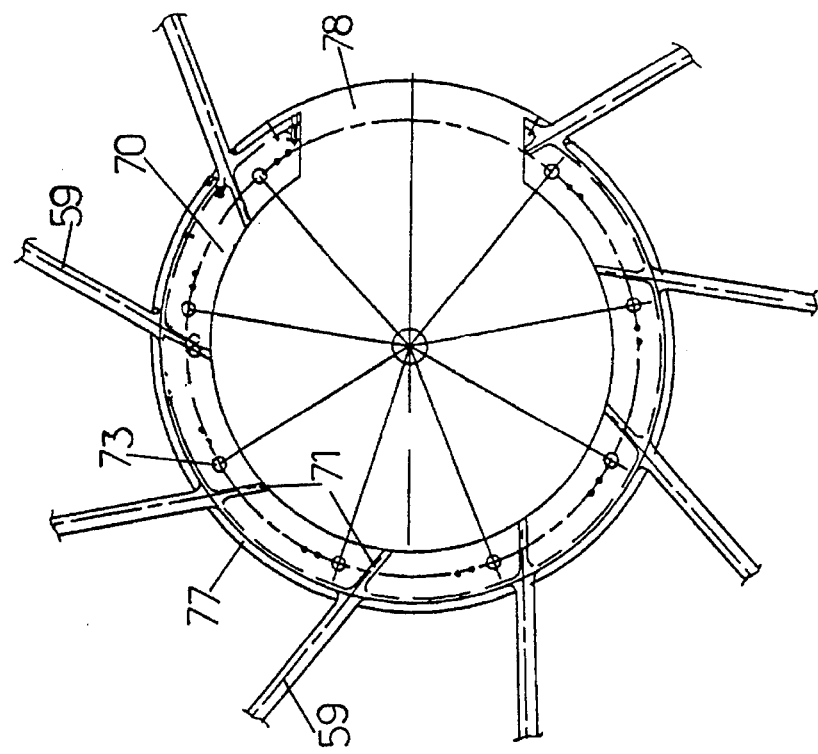
FIG. 16 is a view in the direction of the arrow XVI of FIG. 15.

FIG. 9 represents a flow-straightener alternative which can essentially be distinguished from that of the preceding figures only by the method by which each vane 9' is linked, on the one hand, to the flow-straightener body 14 and, on the other hand, to the annular wall 43 of the duct 6. In this variant, the tabs 44' which are fastened, for example by rivets, to the lateral wall 27 of the annular body 14 are not of a single piece with the profiled part 40' of the vane 9', but are tabs secured to a blade root end fitting 41' attached to the corresponding end of the profiled part 40', the tabs 45' screwed into the annular wall 43 by means of an insert (not represented) embedded in this wall, likewise being tabs secured to a blade tip end fitting 42' attached to the corresponding end of the profiled part 40'. In this example, each of the end fittings 41' and 42' is an end fitting with a cuff into which the corresponding end of the profiled main vane section 40' of the vane 9' is tightly fitted, the tabs 44' and 45' being for example of a single piece of sheet metal with the corresponding cuff 41' or 42'.

FIGS. 10 and 11 represent, limiting themselves to a single vane 9", another flow-straightener alternative in which the fastening tabs 44" and 45" which are respectively riveted or screwed to the body 14 and screwed to the annular wall 43 are secured to end fittings attached to the corresponding ends of the profiled part 40" of the vane 9" but, in this variant, these vane root end fittings 41" and vane tip end fittings 42" are end fittings which are each tightly fitted into the corresponding hollow end of the profiled part 40". The tightly fitted end-fittings 41" and 42" may be held in the corresponding hollow end of the vane 9" by bonding, welding, or any other means. Of course, the tabs 45" of the vane tip end fitting 42" may be held on the annular wall 43 of the duct 6 with the aid of an insert 46, as in the preceding example (see FIGS. 6 and 8).

FIGS. 12 to 16 represent diagrammatically a monobloc flow-straightener variant referenced overall as 58, and of which the vanes 59 and the tubular central body 64 are of a single piece made of composite material. There is therefore no fastening tab at the blade root, but the tip 72 of each vane 59 still exhibits two transverse fastening tabs 75 fastened removably, as in the preceding examples, to the annular wall 43 of the duct 6. However, to ensure necessary rigidity at the vane roots, each vane 59 is extended inside the central body 64 by a rib 71 which extends from the internal radial annular flange 70 of the body 64 at its upstream end, right up to near its downstream end. As in the preceding example, the upstream flange 70 exhibits holes 73 for screw-connection to the fastening tabs of the ends of the arms and of the radial ribs of the casing of the rear transmission box, and these holes 73 for screw-fastening are also substantially radially inside the root of each vane 59. Also, a lateral opening 78 for the passage of the transmission arm 16 is formed in the lateral wall 77, of slightly frustoconical shape, of the annular body 64 as well as in the fastening flange 70.

As an alternative, this flange 70 may be carried by the annular body 64 at its downstream axial end and, whether the flange 70 is at the upstream or downstream end of the lateral wall 77 of the body 64, another flange or rib, for example in the form of a pressed angle bracket made of stainless steel (not represented) may be bonded and riveted into the other axial end of the annular body 64 in order to increase the rigidity thereof.

The composite monobloc flow-straightener 58 may be a compression-molded component made of a composite of density lying between 1800 and 1900 kg/m$^3$ for example, and made up of short fibres of glass or of carbon, with a length in the order of 2.54 cm, representing approximately 67% by weight and approximately 47% by volume of the composite material, and embedded in a vinyl ester resin or PEEK resin, compression-molding being carried out at a pressure of the order of 2.3 to 10 MPa and at a moulding temperature of the order of 130° to 150° C., when the composite material of tradename FIBERITE (reference VE 49 595) from the British company ICI and made of glass fibres and vinyl ester resin is used.

In order to ensure good take-up of the loadings which are transmitted to it by the vanes, whilst having a great lightness, the annular wall 43 of the duct 6, of a single piece forming the convergent nozzle 10, the cylindrical part 11 and the divergent nozzle 12 is a composite sandwich exhibiting, as represented diagrammatically in FIG. 6, also two peripheral annular rims 51 and 52 via each of which the wall 43 is connected to the inside of a respective one of the two composite lateral skins 53 of the flanks of the fairing 5. Between its rims 51 and 52, the annular wall 43 is made up of an inner skin 54 (towards the axis X—X of the duct 6), of an outer skin 55 and of a layer of honeycomb structure 56 extending between the two skins 54 and 55 in order to stabilize them, particularly the internal skin 54 which is the working one. This layer 56 of honeycomb structure, for example made of Nomex (registered tradename) and phenol, exhibits a substantially constant thickness in the convergent nozzle 10 and the cylindrical part 11 of the wall 43, but a greater thickness in the divergent nozzle 12, except in its rounded outlet, in order to ensure good anchorage of the inserts 46 into the layer of honeycomb structure. Each of the skins 54, 55 and 53 is a laminated skin, of substantially constant thickness, and comprises a stack of several layers of fibrous reinforcing fabric, for example made of glass, carbon or aramid, namely hybrid fabrics of glass and carbon fibres, and a synthetic rigidifying resin, the thickness of the internal skin 54 being greater than that of the external skin 55, which itself is greater than the thickness of the lateral skins 53, which are, in order to form the fairing 5 flanks, internally reinforced by a layer of honeycomb structure 57 beyond the zone of superposition of the lateral skins 53 and the annular rims 51 and 52, each formed by the extensions of at least some of the layers of the inner and outer skins 54 and 55. The outer skin also comprises a sealing film, for example made of an intumescent material.

The counter-torque devices described hereinabove are equipped with an easily interchangeable flow-straightener, out of which the assembly made up of the rotor 7 and the rear transmission box 18 in its casing 17 may easily be removed by unscrewing the linking screws at the tips of the arms of the casing. Likewise, the refitting of the rotor and rear transmission box assembly is facilitated, so that the maintenance operations on the counter-torque device are quicker and more economical. These advantages add to the great rigidity of the assembly obtained by improving the mechanical link between the fairing 5, the flow-straightener 8 and the casing 17 supporting the rear transmission box and the rotor 7. The clearance between the tip of the blades 13 of the rotor 7 and the annular wall 43 of the duct 6 may be reduced, which improves the aerodynamic efficiency and acoustic performance of the device. In addition, the mechanical link and acoustic performance are further improved by the various inclinations given to the vanes in the duct.

We claim:

1. Ducted counter-torque device for a rotary-wing aircraft comprising:

a substantially axisymmetric duct of axis substantially transverse to the longitudinal axis of the aircraft, and passing through a fairing in the rear part of the aircraft, a multi-blade rotor mounted substantially coaxially in the duct and driven by a rotational-drive mechanism fixed substantially coaxially in the duct, so that the rotation of the rotor generates an airflow in the duct, and a flow-straightening stator, fixed in the duct downstream of the rotor, with respect to the direction of the airflow, and including an annular central body surrounding the rotational-drive mechanism, as well as stationary vanes each exhibiting, between a vane root and a vane tip, a main vane section with aerodynamic profile straightening out the airflow downstream of the rotor towards the axis of the duct, and extending between the annular central body and an annular wall of the duct, to which body and wall they are each linked respectively by their vane root and by their vane tip, so as to support the rotational-drive mechanism and the rotor within the duct, wherein the said rotational-drive mechanism is encased in a casing equipped with substantially radial rigidifying arms connected to one another by a rim extending in a circumferential direction around at least a part of the casing, the rigidifying arms bearing, at their external radial end, removable fastening means interacting with complementary fastening means formed on an internal radial flange for fastening and centering of the annular central body of the flow-straightener, so as rigidly to fasten the flow-straightener and the casing to one another, and both into the duct.

2. Counter-torque device according to claim 1, wherein the flow-straightener includes at least as many vanes as the casing includes rigidifying arms, and each arm is fastened to the flow-straightener body substantially radially inside at least one vane root connecting the corresponding vane to the said flow-straightener body.

3. Counter-torque device according to claim 1, wherein the rigidifying arms are flattened in a circumferential direction, inclined from the casing towards the flow-straightener body and from the upstream end to the downstream end of the duct, and each reinforced by at least one of substantially radial ribs of substantially triangular shape extending downstream in the duct on the side of the casing, and thinning towards the flow-straightener body, and substantially equal in number to the vanes of the flow-straightener.

4. Device according to claim 1, wherein the casing is molded as a single piece with the rigidifying arms, the rim, the reinforcing ribs, and the removable fastening means including, for each arm, at least one radial tab for screw-fastening to the fastening and centering flange of the flow-straightener body, the fastening tab projecting radially outside the rim.

5. Device according to claim 1, wherein the casing exhibits two neighbouring rigidifying arms in the circumferential direction, which are wider and further separated from one another than the other arms and which between them delimit a cutout for the passage of a transmission arm which couples up to the rotational-drive mechanism, also passing through a lateral opening formed in the annular central body and opposite the cutout in the casing.

6. Device according to claim 1, wherein the annular flow-straightener body, with axially axisymmetric external surface, at least one of a cylindrical and frustoconical shape, against which the vane roots are fastened, exhibits the flange for fastening and centring of the casing at one of its upstream and downstream ends, and a second, internal and annular radial rigidifying flange at its other end.

7. Device according to claim 1, wherein an angle bracket forming a joint between the rotor and the flow-straightener body is held onto the flange for centering and fastening said flow-straightener body by the fastening means securing the arms of the casing against the upstream face of the said flange of the body.

8. Device according to claim 1, wherein the vanes are hollow and individually attached to the flow-straightener body and removably attached to the lateral wall of the duct, with the aid of tabs respectively for fastening their vane root, and their vane tip.

9. Device according to claim 8, wherein at least one tab for fastening at least one of the vane root and the vane tip are of a single piece with the profiled part of the vane.

10. Device according to claim 8, wherein at least one tab for fastening at least one of the vane root and the vane tip are secured to an end fitting attached to the corresponding end of the profiled part of the vane.

11. Device according to claim 10, wherein at least one end fitting attached to a vane is an end fitting tightly fitted into the corresponding hollow end of the vane.

12. Device according to claim 10, wherein at least one end fitting attached to a vane is an end fitting with a cuff into which the corresponding end of the vane is tightly fitted.

13. Device according to claim 8, wherein the vanes are made of composite.

14. Device according to claim 13, wherein each composite vane includes a foam core.

15. Device according to claim 13, wherein each composite vane is an injected vane with a reinforcement made up of short reinforcing fibres, embedded in a matrix of synthetic rigidifying resin.

16. Device according to claim 13, wherein each composite vane is a vane which is molded by transferring an epoxy resin onto fibrous fabrics.

17. Device according to claim 13, wherein each composite vane is produced by shaping fibrous fabrics preimpregnated with a synthetic rigidifying resin.

18. Device according to claim 1, wherein the vanes and the flow-straightener body are of a single piece made of composite material.

19. Device according to claim 18, wherein the composite flow-straightener is a monobloc compression-molded component comprising a reinforcement of short reinforcing fibres embedded in a synthetic rigidifying matrix.

20. Device according to claim 18, wherein each vane of the composite flow-straightener is extended, inside the annular central body, by a rib extending axially from the fastening and centering flange substantially at one of the axial ends of the said body up to substantially the other axial end of the said annular central body.

21. Device according to claim 1, wherein the vanes are radially inclined, from the flow-straightener body towards the wall of the duct, in at least one of the following ways: in the opposite direction to the direction of rotation of the rotor and at a slant from the upstream end towards the downstream end of the duct.

22. Device according to claim 1, wherein each vane is connected to the lateral wall of the duct by fastening its vane tip to an insert sealed into the wall of the duct.

23. Device according to claim 22, wherein the insert is an injection-molded plastic component, reinforced with short reinforcing fibres, and exhibiting a flat fastening face fitting substantially flush into the internal face of the wall of the duct, as well as a cylindrical body with external peripheral ribs for anchoring into the said wall.

24. Device according to claim 1, wherein the lateral wall of the duct is of a single piece made of composite sandwich forming, between two peripheral annular rims for coupling to two composite lateral skins for the fairing, and in succession from upstream to downstream, a convergent inlet nozzle, a cylindrical part, and a divergent nozzle to which the vanes are fastened, and which comprises an internal skin and an external skin between which there extends a layer of honeycomb structure, the thickness of which is greater in the divergent nozzle than it is in the convergent nozzle and the cylindrical part, each of the internal and external skins, of the rims and of the lateral skins being of laminated structure of at least two superimposed webs of fibrous fabric stiffened by a synthetic impregnation resin, the internal skin being of a greater thickness than that of the external skin, the external skin having a greater thickness than that of the lateral skins.

* * * * *